No. 817,957. PATENTED APR. 17, 1906.
W. CHRISTY.
VEHICLE TIRE.
APPLICATION FILED JULY 2, 1903.
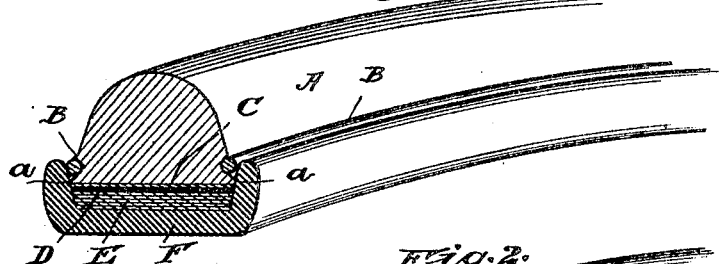
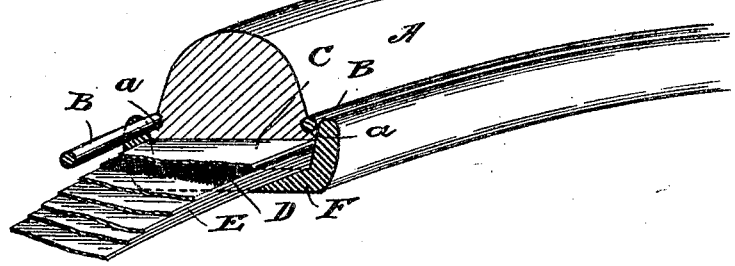
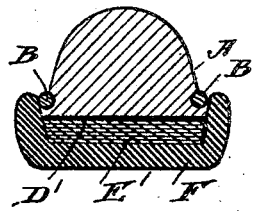 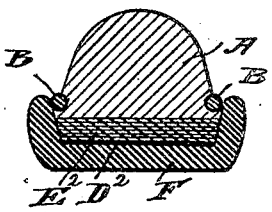
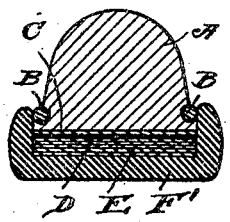
Witnesses,
Inventor,
Will Christy

UNITED STATES PATENT OFFICE.

WILL CHRISTY, OF AKRON, OHIO.

VEHICLE-TIRE.

No. 817,957.  Specification of Letters Patent.  Patented April 17, 1906.

Application filed July 2, 1903. Serial No. 164,031.

*To all whom it may concern:*

Be it known that I, WILL CHRISTY, a citizen of the United States, residing at Akron, in the county of Summit and State of Ohio, have invented certain new and useful Improvements in Vehicle-Tires, of which the following is a specification.

My invention relates to elastic tires for vehicles, and more particularly to that class of elastic tires which comprises a solid-rubber tire-body in association with a stiffened base and fastening means, such as wires, for retaining the same in the channeled rim. Many tires of this character are now secured in place by means of internal wires embedded in the body of the rubber. Such fastening means, however, are quite difficult to apply, besides injuriously affecting the tire by the cutting action which they produce therein. As an alternative for such a construction the practice has arisen of employing external securing-wires seated on marginal shoulders formed on or in the opposite sides of the tire-body substantially flush with or slightly below the outer margins of the side walls of the channel; but such a wide separation of the fastening means has necessitated the provision of a tire-base of increased transverse stiffness or rigidity. Such increased rigidity has been secured in some instances by transverse wires or rods embedded in the base portion of the tire and at their outer ends overlaid by the fastening-wires. As a less expensive substitute for such a stiffening means it has been proposed to employ a thck canvas base or backing for the rubber member; but such a stiffening means lacks the required degree of rigidity for coöperation with the external fastening means described.

My invention therefore has for its object to render efficient and practicable the use of a thick canvas backing for the tire in coöperation with lateral external fastening-wires through the provision of means incorporated with or applied to the canvas backing for sufficiently increasing the transverse stiffness or rigidity thereof to render the tire practicable in service. Briefly stated, such means consists of a strip of foraminous or reticulated material of greater stiffness than the canvas or other stiffened backing or foundation of the tire and associated or incorporated with the latter, such strip being preferably of woven wire embedded in and between the surfaces of the canvas backing.

My invention in its preferred form is illustrated in the accompanying drawings, wherein—

Figure 1 is a perspective view of a section of a tire and its containing-channel made in accordance with my invention, one end thereof being shown in transverse section. Fig. 2 is a similar view showing the elements of the stiffened base projected forwardly of the sectional face to more clearly illustrate their form and relation to each other. Figs. 3 and 4 are cross-sectional views illustrating slight modifications of the stiffened base, and Fig. 5 is a transverse section showing a tire embodying my invention applied to a rim having vertical rather than outwardly-flaring or divergent side walls or flanges.

Referring to the drawings, A designates the main body or tread of the tire, which is formed of resilient material, preferably rubber, and preferably made solid, as shown. On either side of the tread A are formed lateral inwardly-set shoulders $a$, designed to receive and seat a pair of circumferential fastening-wires B in the manner well understood in tires of this class.

The stiffening or backing constituting the base or foundation of the tire proper is preferably formed as follows: C designates a layer of stiff canvas cemented or otherwise secured to the flat base of the resilient tread. D designates a strip of foraminous or reticulated material of considerably greater stiffness than the canvas, such strip being preferably of metal, such as woven-wire fabric, herein shown of the full width of the tire-base and suitably united to the under side of the canvas layer C. E designates the lower or innermost fabric member, which is preferably formed by a layer of canvas doubled or overlapped upon itself several times and compressed and united to form a substantially solid and integral stiffening member, which is securely united to the under side of the woven-wire member D. The tire-body, with its stiffened base thus formed, is seated snugly in the channel of the rim F, the fastening-wires B resting on the shoulders $a$ and held against dislocation by the outer margins of the side flanges of the channel, serving to maintain the tire-body securely in place in the rim. The woven-wire or other stiffening member of the base or backing may, as is obvious, be incorporated in and between the canvas strips C and E in the process of manufacture, if desired, constituting, essentially, an integral part thereof, or the canvas strip on either side of the woven-wire member may be omitted where the foraminous strip and a single canvas strip or body are together of sufficient thickness and rigidity to answer the purpose, as shown in Figs. 3 and 4, wherein, in Fig. 3, D' represents the foraminous strip on the outer side of a single thickened canvas backing E', and wherein D² represents such a strip applied to the inner surface of a single thickened canvas base E². However, I prefer the construction shown and described in Figs. 1 and 2, wherein the woven-wire or other foraminous or reticulated member is incorporated into the thickened canvas base. In Fig. 5 I have illustrated the same construction of tire-body as shown and described in Figs. 1 and 2, but seated in a channel-rim F', having vertical, rather than divergent, side walls.

In practice where the preferred form (woven wire) of stiffening material herein shown is employed it is very easily applied to or incorporated in the thickened canvas backing, Being a commercial article and not requiring to be especially formed for this purpose (beyond being cut to the required sizes) it is relatively inexpensive. While being applied uniformly over and throughout the entire longitudinal and transverse extent of the base it stiffens the same equally throughout and produces a base of uniform and equal strength throughout.

I claim—

1. A vehicle-tire of the character described, comprising a resilient tread portion and a stiffened base portion or backing applied to the inner surface of said tread portion, said stiffened base having as an element thereof a strip of foraminous or reticulated material of greater stiffness than the material with which it is associated, substantially as described.

2. A vehicle-tire of the character described, comprising a resilient tread portion and a thickened canvas base portion or backing applied to the inner surface of said tread portion, said canvas backing having associated therewith a strip of foraminous or reticulated material of greater stiffness than said canvas base, substantially as described.

3. A vehicle-tire of the character described, comprising a resilient tread portion and a thickened canvas base portion or backing applied to the inner surface of said tread portion, said canvas backing having associated therewith as a stiffening element a foraminous or reticulated metal strip, substantially as described.

4. A vehicle-tire of the character described, comprising a resilient tread portion and a thickened canvas base portion or backing applied to the inner surface of said tread portion, said canvas backing having incorporated therewith as a stiffening element a strip of woven wire substantially commensurate in surface area with said canvas base, substantially as described.

5. A vehicle-tire of the character described, comprising a solid-rubber tire-body, a thickened fabric base, and, incorporated in the latter, a strip or layer of woven wire for the purpose of stiffening the base transversely, substantially as described.

6. The combination with a laterally-shouldered resilient tire-body having a thickened fabric base in which is incorporated a strip or layer of woven wire or like reticulated sheet metal for the purpose of stiffening the base transversely, of a channeled rim in which the same is seated, and fastening-wires engaging the shoulders of the tire-body to secure the latter in the rim, substantially as described.

WILL CHRISTY.

Witnesses:
SAMUEL N. POND,
ROBT. J. FIRESTON.